C. J. LANGLEY AND C. P. WOOD.
STERILIZING CARRIER FOR CLINICAL THERMOMETERS.
APPLICATION FILED DEC. 30, 1918.

1,305,471.

Patented June 3, 1919.

INVENTORS.
Cortland J. Langley
Clarence P. Wood
BY Diederheim + Fairbanks
ATTORNEYS

UNITED STATES PATENT OFFICE.

CORTLAND J. LANGLEY AND CLARENCE P. WOOD, OF PHILADELPHIA, PENNSYLVANIA.

STERILIZING-CARRIER FOR CLINICAL THERMOMETERS.

1,305,471.  Specification of Letters Patent.  Patented June 3, 1919.

Application filed December 30, 1918. Serial No. 268,897.

*To all whom it may concern:*

Be it known that we, CORTLAND J. LANGLEY and CLARENCE P. WOOD, citizens of the United States, residing in the city and county of Philadelphia, State of Pennsylvania, have invented a new and useful Sterilizing-Carrier for Clinical Thermometers, of which the following is a specification.

Our invention consists of a sterilizing carrier for a clinical thermometer composed of members as will be hereinafter described, the novel features of the same being pointed out in the claims that follow the specification.

The invention is satisfactorily illustrated in the accompanying drawing, but the important instrumentalities thereof may be varied, and so it is to be understood that the invention is not limited to the specific details shown and described, as long as they are within the spirit or scope of the claims.

Similar numerals of reference indicate corresponding parts in the figures.

Referring to the drawings—

Figure 1:
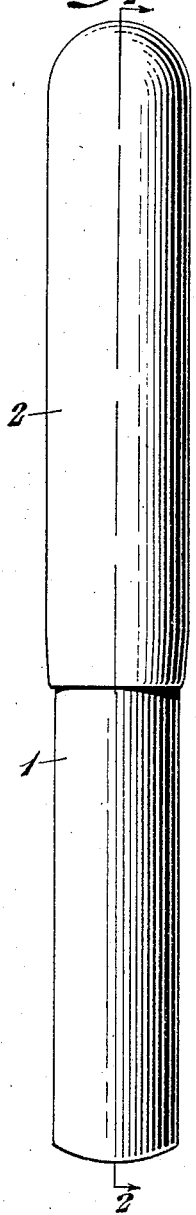
Figure 1 represents a side elevation of a sterilizing carrier for a clinical thermometer embodying our invention.

1 designates a barrel comprising the body of an exterior casing of the device, and 2 designates a closing cap for the open end of said barrel, said cap and barrel being formed of hard rubber or other suitable material and adapted to be connected by screw threads 3 or other suitable means on the respective parts.

4 designates a tube or vial of glass or other transparent material which is placed in the barrel 1 and adapted as a receptacle for a sterilizing fluid. 5 designates a clinical thermometer of conventional or other form, the same being insertible in the vial 4 and adapted in the main to dip into the sterilizing fluid therein, the upper or handle portion of said thermometer being adapted to occupy the interior of the cap 2 whereby it is readily accessible when the latter is removed.

In the side of the barrel is the sight opening 6 which exposes a portion of the transparent vial 4 so that when the cap is removed the condition of the fluid in the vial may be viewed through the wall of the latter, said cap being of such length that when it is in position on the barrel said opening is both concealed and covered and the vial is not exposed and so the latter is not liable to be broken from the exterior of the barrel.

7 designates a tubular gasket of soft rubber or other suitable resilient material, the same being seated on the top of the vial 4 and so near the upper end of the interior of the barrel 1, the bore of said gasket being adapted to receive the contiguous portion of the thermometer and sufficiently tightly embrace the same.

Interposed on said gasket and separate therefrom is the tubular bushing 8 of hard rubber or other suitable rigid material, the same having on its bottom the exteriorly threaded neck 9 of reduced diameter, above the same, the conical portion 10 and intermediate of the latter and said neck the outturned shoulder 11, it being noticed that the side of said neck may be screwed into the interior of the upper portion of the barrel 1 and so be secured positively thereto, the bottom of said neck may be seated on the top of the gasket 7 so as to retain the latter in place and impart the proper compression and tension to the same, and the shoulder 11 may be seated on the top of the vial 4, and form a tight joint therewith and a stop for the positioning of said bushing, it being noticed that the bore of the latter is adapted to receive the contiguous portion of the thermometer, the bushing serving also as a guide for the thermometer in its movements in and out, and means for holding and steadying the thermometer true while in the vial.

On the side of the conical portion 10 of the bushing is the knurl 12 by which the bushing may be firmly grasped or gripped admitting of the convenient operation of the bushing in applying and removing the same to and from its position.

In the bottom of the vial is the cushion 13 of cotton or other suitable soft material on which the adjacent point or end of the thermometer may be rested to prevent breakage of the same.

In the bottom of the barrel is the opening or port 14 which extends therethrough forming a vent for the escape of air while locating the vial in the barrel and also permit of the insertion of a pin or other implement to reach the bottom of the vial and exert pressure on said bottom to assist in removing the vial should it stick in the barrel.

It will be seen that when the cap is removed the thermometer may be drawn out and removed for use in sterilized condition. As it passes through the gasket it is wiped of the sterilizing fluid by its contact with the bore of the gasket and that of the bushing, in which cleansed condition it may be applied to the patient whose temperature is to be taken. As the thermometer leaves the gasket the latter contracts and its bore closes whereby the sterilizing fluid cannot escape from the vial.

When the thermometer is to be restored into the vial and consequently into the sterilizing fluid it is pushed through the bushing and gasket when the bore of the latter opens to permit the thermometer to pass therethrough, the gasket then tightly closing against the thermometer assisting with the bushing to hold and steady the thermometer in place.

Figure 2:
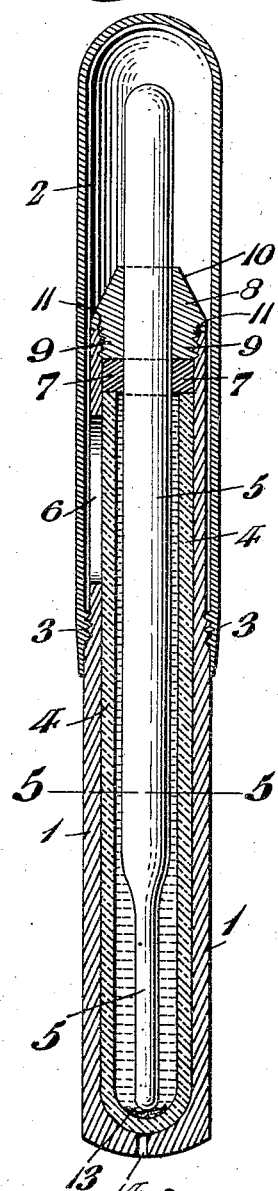
Fig. 2 represents a longitudinal section thereof on line 2—2 Fig. 1.
Figure 3:
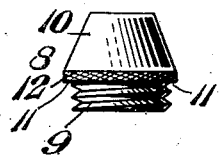
Fig. 3 represents a side elevation of a bushing employed in the device.
Figure 4:
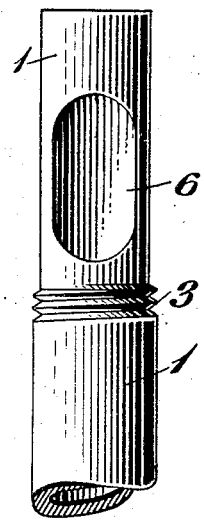
Fig. 4 represents a side elevation of a portion of the barrel or body of the exterior casing of the device.
Figure 5:
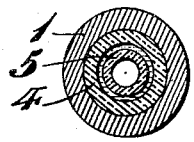
Fig. 5 represents a transverse section on line 5—5 Fig. 2.

As the thermometer passes through the bore of the bushing the saliva on the former is wiped-off by the latter, and further wiped by the bore of the gasket, and so as the saliva cannot enter the vial the thermometer reoccupies the sterilizing fluid in clean condition. The cap is then applied to the barrel and secured thereto completely inclosing the top of the thermometer and the top of the bushing and covering the sight opening 6, as illustrated in Figs. 1 and 2. The device may then be placed in a pocket, case or other receptacle with safety against breakage of the interior members or liability of breaking, it being evident that the device is composed of members few in numbers and inexpensive in construction, and said members may be readily disassembled, renewed or replaced by other members if so required, and all of the members as readily reassembled.

Having thus described our invention what we claim as new and desire to secure by Letters Patent, is:—

1. In a sterilizing carrier for a clinical thermometer, a barrel, a cap connectible therewith, a receptacle for sterilizing material adapted to be contained in said barrel, a resilient tubular gasket adapted to be seated on the top of said receptacle, and a tubular bushing of rigid material adapted to be imposed on said gasket, said barrel and bushing being provided with means whereby said bushing may be secured positively to said barrel and adapted to exert compression on said gasket.

2. In a sterilizing carrier for a clinical thermometer, a barrel, the same having an interiorly threaded portion, a receptacle therein adapted to contain a sterilizing material, a resilient tubular gasket in said barrel adapted to be seated on the top of said receptacle and allow a thermometer to enter the same, and a rigid tubular bushing adapted to be connected with said barrel to be seated separately on said gasket and to allow a thermometer to enter the same, said bushing having a threaded neck for connection with said threaded portion of said barrel.

3. In a sterilizing carrier for a clinical thermometer, a barrel, a cap connectible therewith, a receptacle for sterilizing material in said barrel, said receptacle being formed of transparent material, and means on said barrel and receptacle for retaining a thermometer in the latter, said barrel having in its side a sight opening whereby the contents of said receptacle may be viewed through the wall of the latter from the exterior of said barrel.

4. In a sterilizing carrier for a clinical thermometer, a barrel, the same having in its side a sight opening, a receptacle therein adapted to contain a sterilizing material, a resilient tubular gasket in said barrel adapted to be seated on the top of said receptacle and allow a thermometer to enter the same, and a rigid tubular bushing adapted to be connected with said barrel to be seated separately on said bushing and to allow a thermometer to enter the same, said bushing having a threaded neck for connection with said barrel and provided on its side with a grasping knurl, said cap when attached to said barrel being adapted to cover said sight opening.

5. In a sterilizing carrier for a clinical thermometer, a barrel, a receptacle therein adapted to contain sterilizing material for the thermometer, the bottom portion of said barrel having therein a port adapted to form both an air vent and means for directing an implement to the bottom of said receptacle to assist in removing the latter from said barrel.

6. In a sterilizing carrier for a clinical thermometer, a barrel, a receptacle for sterilizing material adapted to be contained in said barrel, a gasket adapted to be seated on the top of said receptacle, said gasket having an opening therein, and a tubular bushing having a reduced neck adapted to be seated on said gasket, the thermometer being adapted to be passed through the bores of said bushing and gasket, said bushing having on its side an outturned shoulder which is adapted to be seated on the top of said barrel.

7. In a sterilizing carrier for a clinical thermometer, a barrel, a receptacle for sterilizing material adapted to be contained in said barrel, a gasket adapted to be seated on the top of said receptacle, said gasket having an opening therein, and a tubular bushing having a reduced neck adapted to be seated on said gasket, the thermometer being adapted to be passed through the bores of said bushing and gasket, said bushing having on its side an outturned shoulder which is adapted to be seated on the top of said barrel, a portion of the side of said bushing above said shoulder having thereon a grasping knurl.

CORTLAND J. LANGLEY.
CLARENCE P. WOOD.

Witnesses:
WM. H. BEGLEY, Jr.,
C. TREVOR DUNHAM.

Copies of this patent may be obtained for five cents each, by addressing the "Commissioner of Patents, Washington, D. C."